United States Patent
Figura

[19]
[11] Patent Number: 5,699,863
[45] Date of Patent: Dec. 23, 1997

[54] APPARATUS FOR GROOMING FIELDS

[75] Inventor: William L. Figura, Rice Lake, Wis.

[73] Assignee: Applied Design Technology, Ltd., Chetek, Wis.

[21] Appl. No.: 191,945

[22] Filed: Feb. 3, 1994

[51] Int. Cl.[6] ............................................. A01B 49/02
[52] U.S. Cl. ................... 172/145; 172/189; 172/197; 172/200; 172/612
[58] Field of Search ................... 172/146, 197, 172/199, 200, 612, 611, 189, 145; 37/219, 221

[56] References Cited

U.S. PATENT DOCUMENTS

| | | | |
|---|---|---|---|
| 398,960 | 3/1889 | Goodman | 172/197 |
| 1,079,752 | 11/1913 | Erikson | 172/612 |
| 1,144,503 | 6/1915 | Pounder | 172/612 |
| 1,530,329 | 3/1925 | Roberts | 172/612 |
| 1,829,745 | 11/1931 | Grossi | 172/612 X |
| 1,861,494 | 6/1932 | Devereux . | |
| 2,871,959 | 2/1959 | Koskenmaki | 172/197 |
| 3,448,814 | 6/1969 | Bentley et al. | 172/197 X |
| 3,666,020 | 5/1972 | Hess | 172/612 |
| 3,878,900 | 4/1975 | Boisse et al. | 172/197 X |
| 3,915,239 | 10/1975 | Hendrichon | 172/197 X |
| 4,505,338 | 3/1985 | Koval et al. | 172/611 |
| 4,651,450 | 3/1987 | York et al. | 37/197 |
| 4,836,295 | 6/1989 | Estes | 172/146 |
| 5,075,985 | 12/1991 | Mensch | 37/233 X |
| 5,183,119 | 2/1993 | Wattenburg | 172/612 X |

FOREIGN PATENT DOCUMENTS

| | | | |
|---|---|---|---|
| 503917 | 6/1951 | Belgium | 172/612 |
| 0161239 | 11/1985 | European Pat. Off. | 172/612 |
| 31896 | 6/1927 | France | 172/611 |
| 97550 | 6/1897 | Germany | 172/611 |
| 441997 | 1/1936 | United Kingdom | 172/189 |

*Primary Examiner*—Terry Lee Melius
*Assistant Examiner*—Christopher J. Novosad
*Attorney, Agent, or Firm*—Larry M. Jennings, P.A.

[57] ABSTRACT

The invention discloses apparatus for grooming, leveling and conditioning athletic fields comprised of a leveling trowel having beveled ends. Soil is worked using elastomeric flails disposed into contact with the surface by a rigid weight bar pivotally mounted on the upper surface of the independently pivotable flails. The grooming apparatus may be mounted with a two or three-point hitch assembly or towed by a drawbar from any utility tractor or other landscape vehicle.

16 Claims, 6 Drawing Sheets

APPARATUS FOR GROOMING FIELDS

FIELD OF THE INVENTION

The present invention relates to equipment for grooming, leveling and finishing fields, particularly athletic fields such as baseball infields. It may be used for other types of fields and in the final preparation of seedbeds in landscape and turf application. The invention discloses a grooming implement adapted to operate over an unusually broad range of conditions. The desired grooming may also be accomplished more quickly and with fewer machine passes than is typical with conventional apparatus. Drag screens, drawbar pulled spiking drag devices, drawn brushes, and rubber flail attachments without parallel alignment of the flails or a leveling trowel are typical of the state of the art.

BACKGROUND AND SUMMARY OF THE INVENTION

A properly maintained and groomed playing field is necessary for a variety of athletic and recreational activities. In particular, baseball infields, like clay tennis courts, must be properly groomed, leveled, and finished in order to both provide the proper playing surface and to reduce the potential for player injury during the course of the game. Other athletic fields and running tracks must also be groomed to prevent deterioration due to the wear to which they are subjected.

Previously available field grooming implements have included adaptations of harrows designed for agricultural use, drags such as the ones disclosed by Roberts in U.S. Pat. No. 1,530,329, and Devereux in U.S. Pat. No. 1,861,494, and a variety of nets. Such devices have tended to leave the surface in a less than optimally uniform condition. U.S. Pat. No. 4,836,295 to Estes discloses apparatus for conditioning baseball infields with an apparatus which appears operable under favorable conditions; it seems likely that the rotary elements of the Estes invention would be prone to clogging when conditions are wet. The limited success of many prior attempts to make athletic field grooming equipment is at least partly due to the fact that most such equipment operates satisfactorily only when conditions are optimum. For example, the previously identified inventions, and other unpatented field grooming equipment, appear prone to fouling or clogging when the soil is damp; others lack sufficient soil breaking ruggedness to groom hardened fields well.

Another disadvantage of previously known grooming implements is that they tend to throw up ridges at the ends of the cutting, leveling, or smoothing blades. Most grooming implements allow some of the worked dirt to be pushed beyond the end of the operational blade(s) and, for that reason, leave small ridges of dirt on the groomed surface. In order to keep the field level, it is necessary to pull the drag in an overlapping pattern to prevent the height of the ridge from increasing with each pass of the grooming equipment. Unfortunately, the ridge-forming tendency is particularly pronounced at the transition between dirt and turf playing surfaces such as those where baseball infield and outfield meet. Conventional grooming equipment must not be operated on turf areas because to do so will destroy the sod. Over time, dirt which passes the end of the grooming blade can build up at the margin of the grass and form a substantial ridge capable of causing unpredictable playing results.

The objections to previous field grooming equipment, implements and apparatus, defined herein as equivalent expressions, are overcome by the present invention. It is designed for leveling, finishing and conditioning baseball fields, athletic fields, and running tracks. It can also accomplish the final seedbed preparation for landscaping applications. The grooming apparatus disclosed herein is adapted for two-point or three-point hitch mounting on utility tractors, garden tractors, utility vehicles, and self propelled bunker rakes.

A bevel-ended leveling trowel is mounted so that it can contact the soil. The beveled leveling blade ends reduce the tendency of the leveler to leave ridges in the groomed soil. The trowel is angled at an acute angle, preferably in the range of 45 to 80 degrees, with respect to the unworked soil. The trowel depends from the tool bar and is mounted immediately forward of, and under, the leading edge of a series of linear, pivotally mounted, parallel, floating, rubber finishing flails. Each of the flails has multiple points or protrusions extending generally vertically downward from the side disposed in contact with the soil surface. The finishing flails are commercially available from, among other sources, suppliers of sugar beet handling equipment. A pivotable, rigid weight bar or pipe rests on the upper sides of the flails and keeps them from flipping up when the apparatus is in operation; the weight bar also enhances the soil-working and leveling performance of the apparatus.

An optional independently mounted scarified attachment of conventional design is comprised of a set of chisels mounted from a frame. The chisels are approximately 2" square and slanted to raise and break up the did as a motor vehicle on which the grooming apparatus and scarifier are mounted moves forward. The chisels may be adjusted to penetrate the desired depth (e.g. ¾") and may be mounted on the front of the tractor. The scarifier is particularly useful when grooming fields that have become dried after having become compacted with use when the soil was wet.

DETAILED DESCRIPTION OF THE DRAWING

Figure 1:
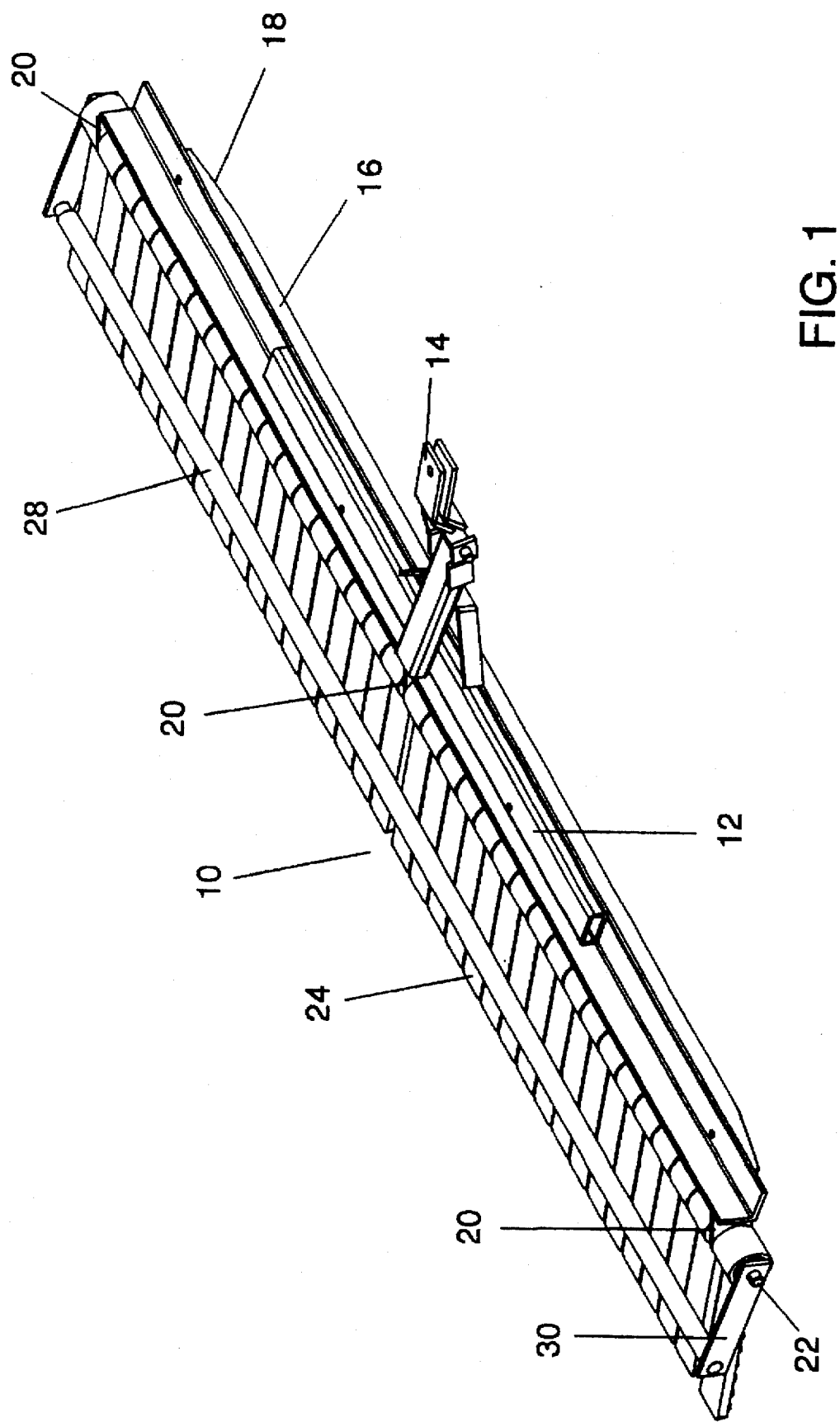
FIG. 1 shows a perspective view of an embodiment of the invention.

FIG. 1 shows a preferred embodiment of the apparatus for grooming fields 10. A tool bar 12 is equipped with suitable means for attachment 14 to a motor vehicle 15 such as a lawn tractor, a garden tractor, a utility tractor, a self-propelled bunker rake, or other types of utility vehicle. The attachment means 14 may be comprised of two-point, three-point or other lifting hitches; the attachment 14 depicted in FIG. 1 is a conventional type of draw-bar hitch.

Figure 2:
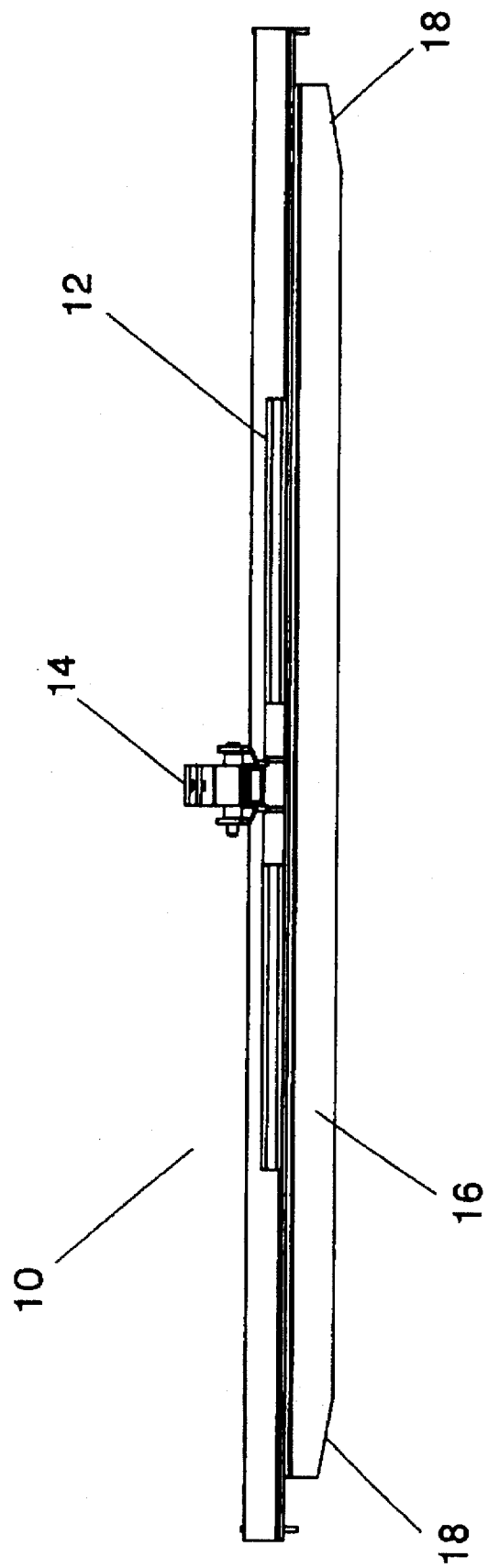
FIG. 2 is a front elevation of the embodiment depicted in FIG. 1.
Figure 3:
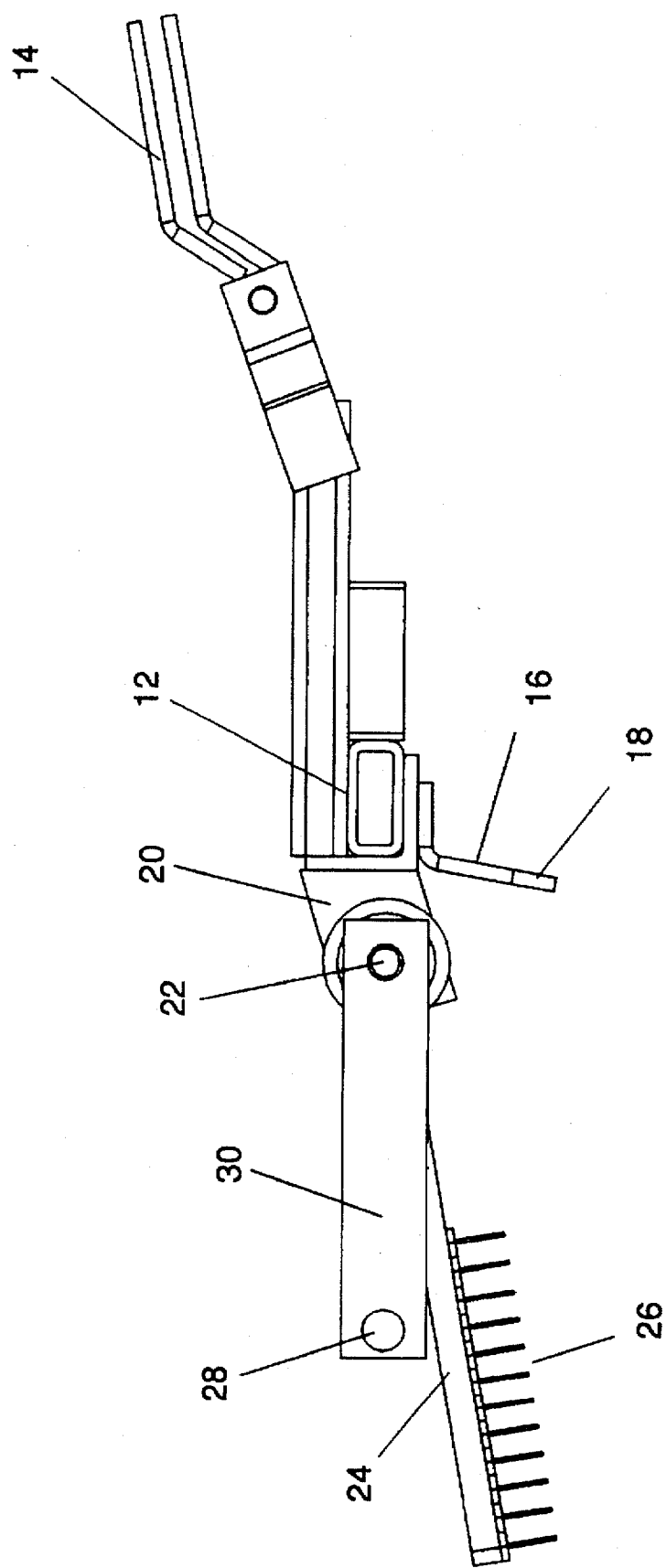
FIG. 3 is a side elevation of the embodiment depicted in FIG. 1.

FIG. 2 depicts a front view of the apparatus for grooming fields which shows the leveling trowel 16 which extends downwardly from the tool bar 14 into contact with the soil to be groomed. The leveling trowel 16 is angled at an acute angle with respect to the surface of the soil that is in the direction of travel, as may be seen in FIG. 3. That angled orientation causes soil to pass under the leveling trowel 16 rather than flowing past the ends as the apparatus is moved over the field. The end portions 18 of the leveling trowel 16 are beveled upward to prevent formation of ridges of dirt from being formed with successive passes of the apparatus 10 over a field.

Figure 4:
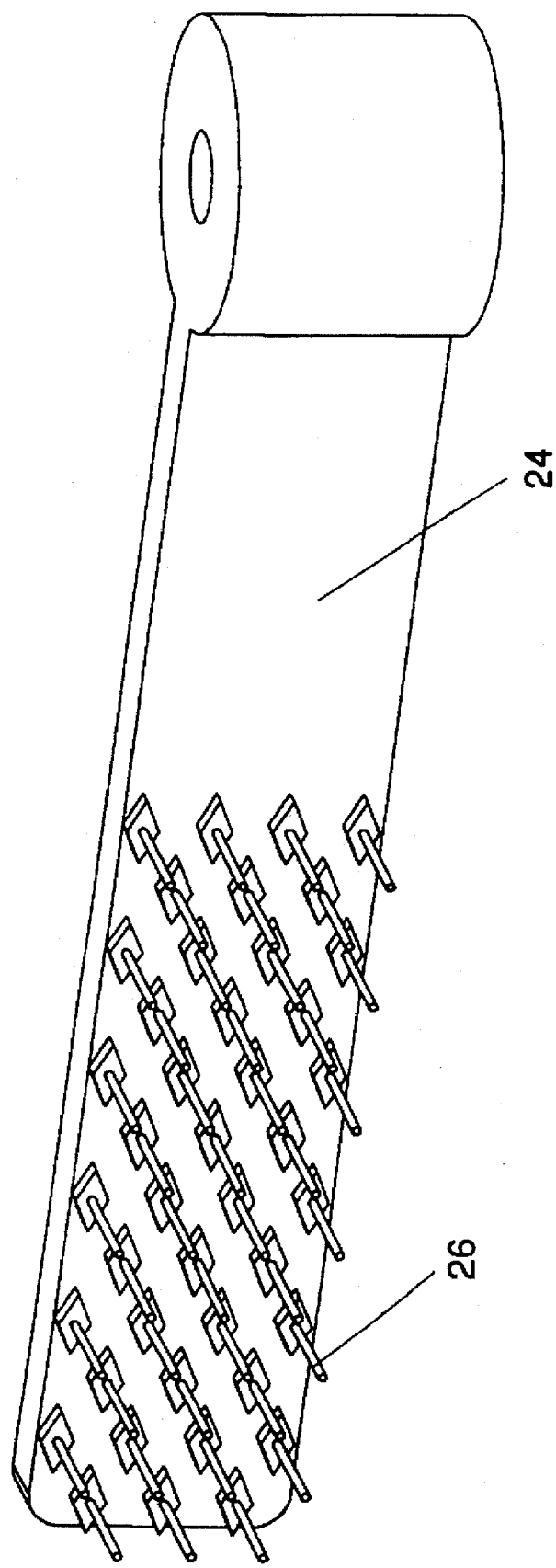
FIG. 4 shows a perspective detail of the underside of the flails according to the embodiment depicted in FIG. 1.

Brackets 20 extend from the back of the tool bar 12 for holding the pivot rod 22. Finishing flails 24, are shown in detail in FIG. 4; they are preferably made of elastomeric material such as butyl or other types of rubber and may be adapted from commercially available components such as those employed in sugar-beet harvesting and handling equipment. The finishing flails 24 are disposed upon pivot rod 22 and extend rearward from it maintaining a parallel alignment of the portions so extended. The finishing flails 24 have soil-working protrusions 26 which extend downwardly for eliminating clods by breaking up the groomed soil.

A weight bar 28 is disposed over the flails 24, to bias the soil-working protrusions 26, downward sufficiently to result in thorough working of the soil as the apparatus is drawn forward. The weight bar 28 is connected to the tool bar 12 by pivotal links 30 which may extend from the ends of pivot rod 22 or from other mounting points. Weight bar 28 may be solid or hollow; when a hollow embodiment is selected, the weight bar 28 may be filled with sand in order to vary the downward bias it exerts. The weight bar 28 diameter may be changed to optimize operation in a variety of soil conditions and types.

Figure 5:
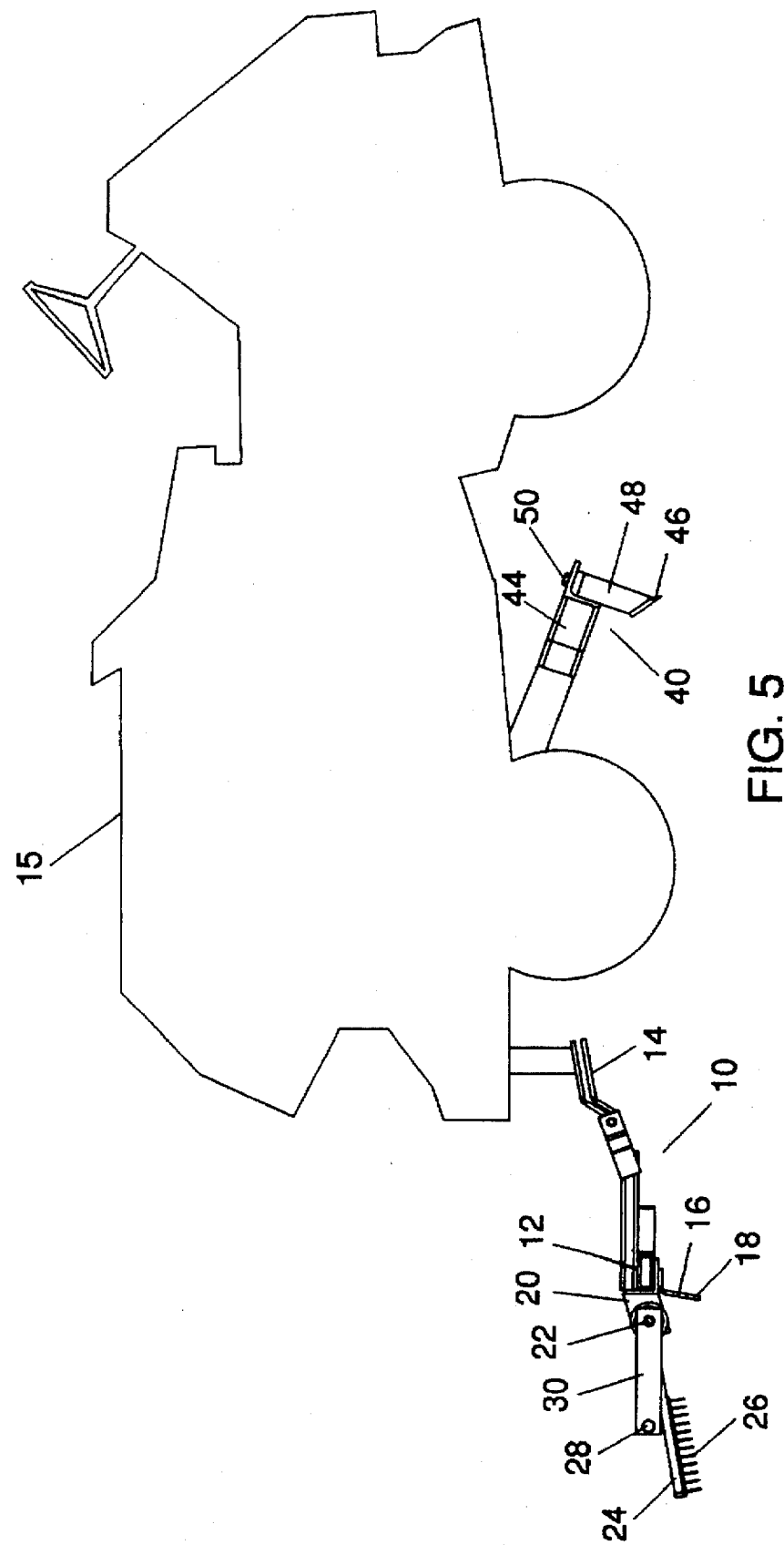
FIG. 5 shows a side elevation of the invention mounted on a motor vehicle together with the optional scarifier portion.
Figure 6:
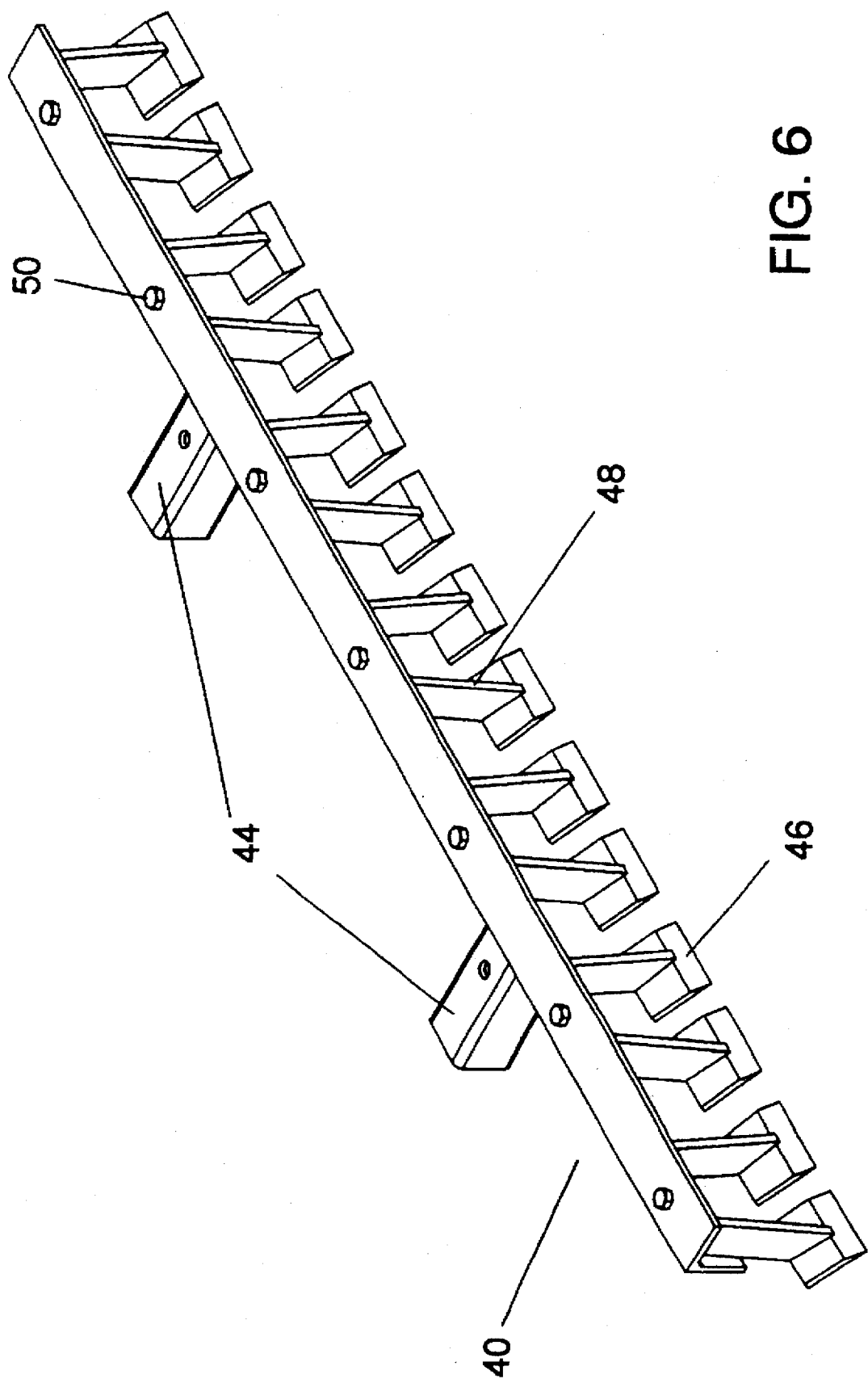
FIG. 6 shows a perspective view of the optional scarifier portion of the invention.

An optional scarifier portion 40 of conventional design may be mounted in tandem with the grooming apparatus 10 or, as shown in FIG. 5, mounted to the front of a suitable motor vehicle 15. The scarifier 40 is comprised of a frame 42 having means for attachment 44 to a motor vehicle as may be viewed in perspective in FIG. 6. It is to be understood that the attachment means may also be used to lift the scarifier 40 and to control the depth to which chisels 46 penetrate the soil. Chisels 46 are affixed to chisel shanks 48 which depend from the frame 42. Removable attachment means 50 are provided for holding chisel shanks 48 to frame 42 in order to permit replacement of worn chisels 46.

Changes and modifications in the specifically described embodiments can be carried out without departing from the scope of the invention which is intended to be limited only by the scope of the appended claims.

What is claimed is:

1. Apparatus for grooming fields comprising:
   an elongated tool bar having a forward portion, a bottom portion, a top portion, a first end, a second end, and a rearward portion;
   means for attaching said tool bar to a motor vehicle so that said forward portion is proximate to said motor vehicle and the tool bar is oriented generally perpendicular to the ordinary direction of travel of said motor vehicle;
   a leveling trowel affixed to and dependent from said tool bar so that said leveling trowel comes into contact with the field to be groomed;
   means for attaching a pivot rod to said tool bar;
   a multiplicity of elongated parallel-aligned flails pivotally disposed upon said pivot rod and extending rearward from said pivot rod, said flails each being comprised of:
   means for pivotal attachment to said pivot rod,
   an upper portion,
   a flattened, soil-contacting lower portion, and
   a multiplicity of soil-working protrusions dependent from said soil-contacting lower portion; and
   biasing means for biasing said flails against the soil.

2. The apparatus defined in claim 1 further comprising:
   a weight bar for biasing said flails against the soil, said weight bar being oriented generally parallel to said tool bar and disposed across said upper portions of said flails generally above said soil-working protrusions; and
   pivotal links connecting said weight bar to said pivot rod.

3. The apparatus defined in claim 2 wherein said leveling trowel is further comprised of:
   an elongated soil-working portion having a central leveling segment and two end leveling segments;
   said soil-working portion is angled at an acute angle with respect to soil present in the direction of apparatus travel;
   said central leveling segment of said soil-working portion is straight and generally horizontal; and
   said end leveling segments are gently beveled upward away from the soil.

4. The apparatus of claim 3 further comprising means for scarifying said fields attached to said motor vehicle forward of said leveling trowel.

5. The apparatus of claim 4 wherein said means for scarifying is comprised of:
   a frame;
   means for attaching said frame to a motor vehicle; and
   means for attaching chisels to said frame.

6. The apparatus of claim 5 wherein said means for scarifying is further comprised of:
   rectangular, horizontally disposed, planar chisel elements connected to said frame by means of flattened chisel shanks dependent from said frame.

7. The apparatus of claim 2 further comprising means for scarifying said fields attached to said motor vehicle forward of said leveling trowel.

8. The apparatus of claim 7 wherein said means for scarifying is comprised of:
   a frame;
   means for attaching said frame to a motor vehicle; and
   means for attaching chisels to said frame.

9. The apparatus of claim 8 wherein said means for scarifying is further comprised of:
   rectangular, horizontally disposed, planar chisel elements connected to said frame by means of flattened chisel shanks dependent from said frame.

10. The apparatus of claim 1 further comprising means for scarifying said fields attached to said motor vehicle forward of said leveling trowel.

11. The apparatus of claim 10 wherein said means for scarifying is comprised of:
    a frame;
    means for attaching said frame to a motor vehicle; and
    means for attaching chisels to said frame.

12. The apparatus of claim 11 wherein said means for scarifying is further comprised of:
    rectangular, horizontally disposed, planar chisel elements connected to said frame by means of flattened chisel shanks dependent from said frame.

13. A method for grooming an athletic field comprising the steps of:
    mounting a leveling trowel having beveled ends onto a self-propelled motor vehicle adapted for movement across said athletic field
    engaging said leveling trowel with the soil of said athletic field at an acute angle with respect to the direction of trowel movement across said athletic field;

moving said leveling trowel across said athletic field by means of said self-propelled motor vehicle, and;

working the soil with parallel aligned, pivotally mounted, downwardly biased, elastomeric flails having protrusions on their soil-contacting portions.

14. The method of claim 13 further comprising the steps of:

disposing a weight bar oriented parallel to the surface of said field and perpendicular to the direction of travel of said self-propelled motor vehicle upon said elastomeric flails oppositely from said soil-contacting portions of said elastomeric flails;

urging said flail soil-contacting portions downwardly into contact with the soil of said field;

breaking up said soil to form a surface suitable for athletic activities with the movement of said flail soil-contacting portions across said field;

permitting said elastomeric flails to yield upwardly in response to irregularities in said field only if said weight bar is also deflected upwardly; thereby smoothing the soil.

15. The method of claim 14 further comprising the steps of:

mounting a scarifier engagable with the soil of said field onto said self-propelled motor vehicle forward of said leveling trowel;

scarifying said soil by engaging said scarifier with said soil while said motor vehicle moves across said field, and;

leveling said soil with said leveling trowel, elastomeric flails and weight bar.

16. Apparatus for grooming fields comprising:

an elongated tool bar having a forward portion, a bottom portion, a top portion, a first end, a second end, and a rearward portion;

means for attaching said tool bar to a motor vehicle so that said forward portion is proximate to said motor vehicle and the tool bar is oriented generally perpendicular to the ordinary direction of travel of said motor vehicle;

a leveling trowel affixed to and dependent from said tool bar so that said leveling trowel comes into contact with the field to be groomed;

means for attaching a pivot rod to said tool bar;

a multiplicity of elongated parallel-aligned flails pivotally disposed upon said pivot rod and extending rearward from said pivot rod, said flails each being comprised of:
means for pivotal attachment to said pivot rod,
an upper portion,
a flattened, soil-contacting lower portion, and
a multiplicity of soil-working protrusions dependent from said soil-contacting lower portion; and a weight bar for biasing said flails against the soil, said weight bar being oriented generally parallel to said tool bar and disposed across said upper portions of said flails generally above said soil-working protrusions; and pivotal links connecting said weight bar to said pivot rod.

* * * * *